F. F. NOLTE.
LIFTER FOR MARKER BARS OF PLANTERS.
APPLICATION FILED JAN. 3, 1914.

1,134,634.

Patented Apr. 6, 1915.
2 SHEETS—SHEET 1.

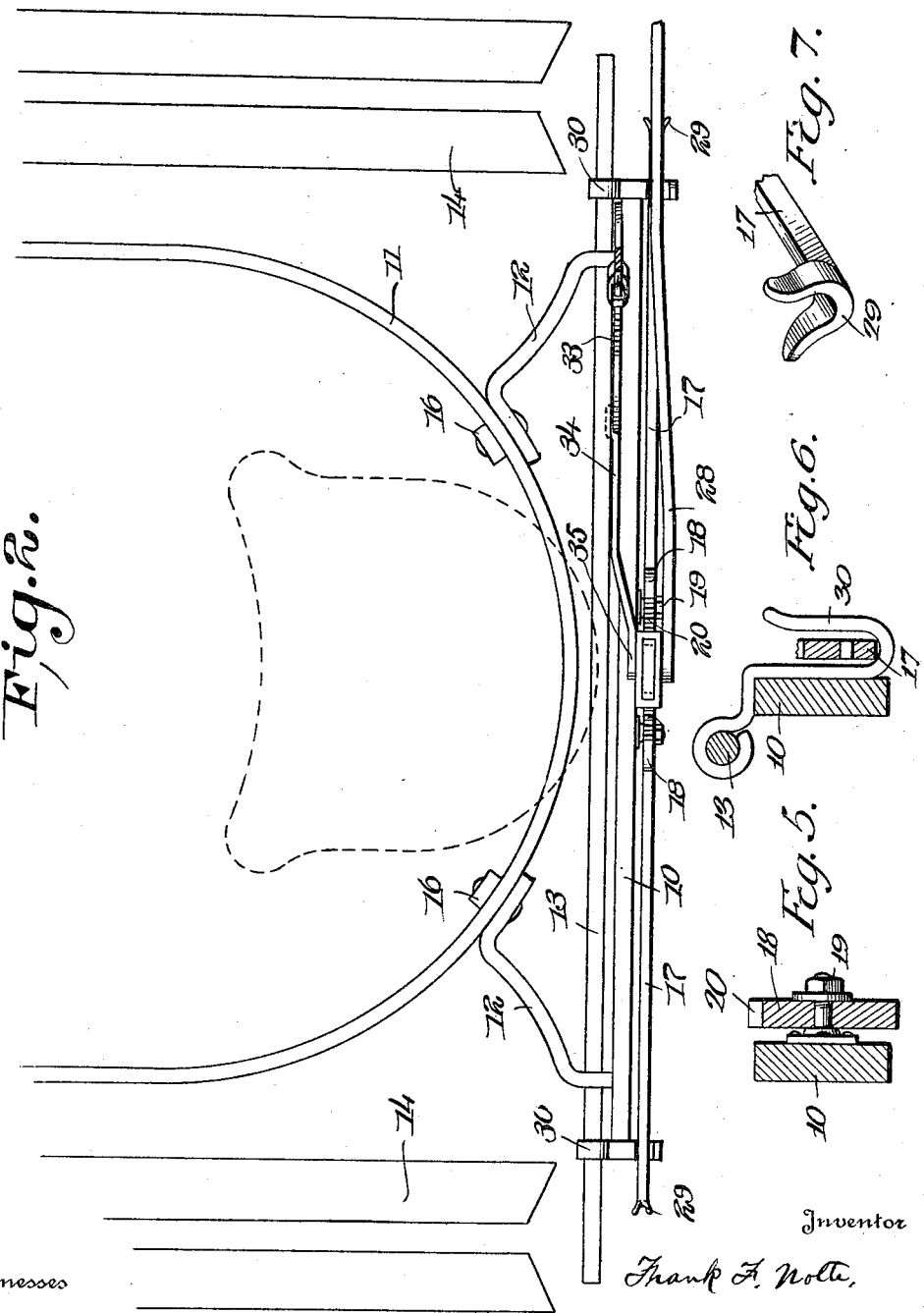

UNITED STATES PATENT OFFICE.

FRANK F. NOLTE, OF BEDFORD, IOWA, ASSIGNOR OF ONE-HALF TO JAMES B. WINDLE, OF BEDFORD, IOWA.

LIFTER FOR MARKER-BARS OF PLANTERS.

1,134,634.  Specification of Letters Patent.  Patented Apr. 6, 1915.

Application filed January 3, 1914. Serial No. 810,232.

*To all whom it may concern:*

Be it known that I, FRANK F. NOLTE, citizen of the United States, residing at Bedford, in the county of Taylor and State of Iowa, have invented certain new and useful Improvements in Lifters for Marker-Bars of Planters, of which the following is a specification.

This invention relates to an improved mechanism for raising and lowering a marker bar carried by a planter, and the principal object of the invention is to provide means for raising and lowering the marker bar and guiding the bar during its upward and downward movement.

Another object of the invention is to so construct the mechanism that the marker bar may be positioned to extend upon either side of the machine desired.

Another object of the invention is to so construct the operating mechanism that the inner end of the marker bar will be moved downwardly while the supporting arms for the bar are being swung to a raised position.

Another object of the invention is to so construct the operating mechanism that the rack bar which operates the supporting arms will also form means for pivotally mounting the marker bar.

Another object of the invention is to so construct the operating mechanism that it may be readily connected with machines now on the market.

This invention is illustrated in the accompanying drawings wherein—

Figure 1 is a rear elevation of a planter with the improved marking device in place; Fig. 2 is a top plan view of the rear end portion of the planter with the marker in place; Fig. 3 is an enlarged fragmentary view of the operating mechanism for the marker with the front wall of the housing removed; Fig. 4 is a sectional view taken along the line 4—4 of Fig. 1; Fig. 5 is a sectional view taken along the line 5—5 of Fig. 3; Fig. 6 is a sectional view taken along the line 6—6 of Fig. 1; and Fig. 7 is a perspective view of the outer end portion of one of the supporting arms.

The operating mechanism for the marking bar is carried by a supporting plate 10 which is connected with the frame 11 of a planter, such as a corn planter by means of the brackets 12 which also support the cross bar 13. The frame of the planter is provided with the usual supporting wheels 14 and driver's seat 15, which seat is mounted upon the legs 16 carried by the frame 11.

The supporting arms 17 are provided with enlarged heads 18 which are pivotally mounted upon the pivot bolts 19 and are provided with teeth 20. A rack plate 21 is slidably mounted in a housing 22, and is provided with teeth 23 which engage the teeth 20 of the head 18. This housing is provided with side openings through which the inner ends of the heads 18 project in order to engage the teeth 23, and is also provided with inner and outer slots 24 and 25 through which the pins 26 and 27 project. The marker bar 28 is pivotally mounted upon the pin 27 and is engaged by the forked end 29 of one of the supporting arms 17. These supporting arms when in the extended position shown in Fig. 1 have their outer end portions supported by hangers 30 which are carried by the cross bar 13. The outer-end portion of the marker has not been shown since this marker bar is of the conventional type and may be provided at its outer end with any suitable means for marking the ground. A latch lever 31 which is of the bell-crank type is pivotally connected with the base plate 10 as shown at 32 and has its latch engaging the rack 33. The arm 34 of the latch lever is provided with an enlarged head 35 in which there is formed a longitudinally extending slot through which the pin 26 passes.

When the marker is in use, the bar 28 is in the position shown in Fig. 1 with the outer end of the marker bar engaging the ground. If it is desired to raise the marker bar, the latch lever 31 is moved toward the seat 15 and this will cause the rack plate 21 to be moved downwardly in the housing. As the plate 21 moves downwardly, the supporting arms will be swung upwardly and the arm which is in engagement with the marker bar will swing the marker bar upwardly. As this plate 21 moves downwardly, it carries the marker bar with it, and therefore the marker bar may be very quickly swung to a raised position. In order to bring the marker bar into engagement with the ground again, the latch lever is returned to the position shown in Fig. 1, and this will cause the arm 17 to be swung downwardly. As the arms swing downwardly, the pivot end of the bar is raised, and this will start the free end of the marker bar downwardly. The marker bar by being supported during its upward and downward movement is prevented from striking the ground with a violent blow and is thus prevented from being broken. After the lever has been moved to swing the marker bar upwardly, the operator can move the marker bar out of engagement with the hook 29 carried by the arm 17 at the right of the machine shown in Fig. 1 and into engagement with the hook 29 of the arm 17 at the left of Fig. 1. The bar can then be lowered and will engage the ground upon the opposite side of the machine from that shown in the figure. It will thus be seen that the marker bar may be positioned to extend upon either side of the machine desired.

By having the device constructed as shown in Fig. 2, the marking attachment may be readily connected with the planters now in use and may be readily transferred from one machine to another.

It is, of course, obvious that if necessary, brackets 12 can be bent at any angle desired in order to properly connect the marker with the frame of the planter.

This marker is very simple in construction and is therefore not liable to readily get out of order or to very quickly break.

It should also be noted that by having the operating mechanism constructed as clearly shown in Fig. 1, the supporting arms 17 may be held at any desired angle, and that therefore the marking mechanism will operate as efficiently upon hilly ground as it will upon level ground.

If it is desired to raise the bar 28 so that it will immediately pass to the opposite side of the machine, the lever 31 may be moved a sufficient distance to bring the end of the marker bar out of engagement with the ground, and after the machine has been turned and started in the proper direction, the lever 31 can then be moved rapidly toward the seat 15 and thus cause the bar 28 to be swung upwardly and past the vertical position into engagement with the forked end 29 of the opposite supporting arms 17. The lever 31 can then be moved back to its original position and cause the supporting arms to be lowered. As these arms are lowered, the bar 28 will fall of its own weight and rest in the lowered position upon the opposite side of the machine from that shown in Fig. 1.

What is claimed is:

1. A marker comprising a base, supporting arms pivotally connected with said base and provided with teeth, a rack plate slidably connected with said base and engaging the teeth of said supporting arms, a marking element pivotally connected with said rack plate and having its free-end portion engaged by the outer end portion of one of said supporting arms, and means for moving said rack plate for swinging said supporting arms to raise and lower said marking element.

2. A marking device comprising a base, a housing carried by said base, a rack plate slidably mounted in said housing, supporting arms pivotally connected with said base and provided with enlarged heads at their inner ends provided with teeth engaging the teeth of said rack plate, and a marking bar pivotally connected with said rack plate and resting upon the outer end portion of one of said supporting arms, and means for moving said rack plate to swing said supporting arms.

3. A marking device comprising a base, a housing carried by said base and provided with inner and outer slots, supporting arms pivotally connected with said base and having their inner-end portions provided with gear teeth, a rack plate slidably mounted in said housing and engaging the teeth of said arms, pins extending from said plate through the slots of said housing, a marking bar pivotally connected with one of said pins and resting upon the outer end portion of one of said arms, and means engaging the other of said pins for moving said rack plate in said housing.

4. A marking device comprising a base, supporting elements pivotally connected with said base, a marking element, slidably mounted means for pivotally mounting said marking element and swinging said supporting means, and means for actuating said last-mentioned means.

5. A marking device comprising a base, a supporting means pivotally connected with said base, slidably mounted operating means for swinging said supporting means, and a marking element supported by one of said supporting means pivotally connected with said operating means.

6. A marking device comprising a base, supporting means pivotally connected with said base, slidably mounted means for moving said supporting means to an adjusted position, a marking element resting upon said supporting means and pivotally connected with said last-mentioned means, and means for moving said slidably mounted means.

7. A marking device comprising a base, supporting means pivotally connected with said base, a slidably mounted element for moving said supporting means, a marking element pivotally connected with said slidably mounted element and resting upon said supporting means, and a bell-crank latch lever pivotally connected with said base and engaging said slidably mounted element.

8. A marking device comprising a base plate, attaching brackets carried by said base plate, a bar carried by said attaching brackets, supporting arms pivotally connected with said base plate, hangers carried by said bar and engaging the outer-end portions of said supporting arms, a marking element passing through one of said hangers and resting upon one of said supporting arms, and means for pivotally mounting said marking element and moving said supporting arms.

In testimony whereof I affix my signature in presence of two witnesses.

FRANK F. NOLTE.

Witnesses:
GEORGE J. HUGHES,
JAMES B. WINDLE.